United States Patent [19]
McIntyre

[11] 4,348,078
[45] Sep. 7, 1982

[54] ENHANCEMENT OF OPTICAL ABSORPTION AND CONTRAST OF ELECTROCHROMIC DEVICES

[75] Inventor: James D. E. McIntyre, Gillette, N.J.

[73] Assignee: Bell Telephone Laboratories, Incorporated, Murray Hill, N.J.

[21] Appl. No.: 173,813

[22] Filed: Jul. 30, 1980

[51] Int. Cl.³ ............................................. G02F 1/17
[52] U.S. Cl. ................................................... 350/357
[58] Field of Search .......................................... 350/357

[56] References Cited

U.S. PATENT DOCUMENTS 4,194,812  3/1980  Hara et al. ............................ 350/357
4,258,984  3/1981  Beni et al. ............................ 350/357

FOREIGN PATENT DOCUMENTS 53-4557    1/1978  Japan ................................. 350/357
53-9559    1/1978  Japan ................................. 350/357
54-101345  8/1979  Japan ................................. 350/357
54-126557  10/1979 Japan ................................. 350/357
54-131896  10/1979 Japan ................................. 350/357

*Primary Examiner*—James W. Davie
*Attorney, Agent, or Firm*—Bruce S. Schneider

[57] ABSTRACT

The optical absorption and contrast obtainable in electrochromic devices are enhanced by the appropriate construction of such devices. This construction includes tailoring the electrochromic electrode to produce a desired optical path length while at the same time adapting the surface of this electrode so that incident light strikes it at angles other than 90 degrees.

7 Claims, 4 Drawing Figures

ENHANCEMENT OF OPTICAL ABSORPTION AND CONTRAST OF ELECTROCHROMIC DEVICES

BACKGROUND OF THE INVENTION

1. Field of the Invention

This invention relates to optical devices and in particular to devices relying on electrochromic effects.

2. Art Background

Electrochromic devices such as those based on $WO_3$ and iridium oxide have been contemplated for use in electro-optic applications. Such electrochromic cells have many outstanding features, e.g., passive long-term memory, the possibility of either black or colored states, wide viewing angle, and sharp electrical thresholds for switching, that make their development of significant interest. However, a number of electrochromic materials with desirable chemical and electrical properties are, nonetheless, too weakly absorbing in the visible wavelength region to produce electro-optic devices with high or even adequate optical contrast.

The contrast of a non-emissive optical device is the difference in intensities of externally incident light reflected or transmitted by the device in its bleached and colored states. This contrast is typically quantified in terms of a contrast ratio—the ratio of the light reflected or transmitted by the device in its bleached state to that reflected or transmitted in its colored state. Electrochromic devices having desirable electrical and chemical properties typically have contrast ratios in the range between approximately 2 to 1 and 4 to 1. Although this level of contrast is adequate for some applications, for devices with more demanding requirements, e.g., multielement information displays, higher contrast ratios are desirable, to allow ready visual resolution and identification of characters and to avoid reader fatigue.

Researchers have attempted to ahieve increased contrast by searching for new electrochromic materials that inherently yield the desired improvement. This approach, however, has not been particularly successful. The search for new electrochromic materials having the desired chemical and electrical properties and that yield large optical absorption changes has been time consuming and generally unavailing. Therefore, electrochromic devices are not preferred in certain applications where high contrast is necessary.

SUMMARY OF THE INVENTION

Enhanced optical absorption and contrast are achieved by specifically tailoring the geometric configuration rather than the chemical composition of an electrochromic device. These enhanced properties are achieved by inducing destructive interference and by producing an increased optical path length in the electrochromic electrode. This effect is achieved by utilizing a device with an electrochromic electrode (1) that has a specially adapted surface which causes light to strike this surface at an oblique angle, (2) that is capable of producing an electrically induced change in reflectance due to the presence of a layer of an electrochromic material, and (3) that has a reflective backing which causes light entering the electrode at the adapted surface to return to this surface. The device is completed by employing a light transmitting electrolyte in contact with the electrochromic material of the electrochromic electrode and a counterelectrode in contact with the electrolyte. To achieve enhancement of contrast, the electrochromic electrode is fabricated with a carefully chosen thickness and surface. The surface is adapted for receiving light at an angle other than normal incidence. The optical path of the electrochromic electrode is chosen so that destructive interference occurs between reflected light (3 in FIG. 1) traversing the electrochromic layer and light, 4, reflected directly from its outer surface. For example, in an electrode having the electrochromic material, 7, directly in contact with a reflective backing surface, 8, the electrochromic layer thickness, d, (6 in FIG. 1) should be within $\pm(\Delta d/4)$ of a value given by $$d = \frac{(2m+1)\pi + \delta_{v12}^r - \delta_{v23}^r}{4\pi n_2 \cos\phi_2} \lambda \qquad (1)$$

where $\phi_2$ is the angle of refraction of the incident light in the electrochromic material, $n_2$ is the real part of the refractive index of the electrochromic material for light of vacuum wavelength $\lambda$, m is an integer (0, 1, 2, ... ), the subscript v indicates the polarization of the incident light relative to its plane of incidence, $\delta_{v12}^r$ and $\delta_{v23}^r$ are the optical phase changes occurring upon reflection at the electrolyte/electrochromic and the electrochromic/reflector interfaces, respectively, and $$\Delta d = \lambda/4n_2 \cos\phi_2. \qquad (2)$$

(All parameters defined above refer to the colored state of the electrochromic electrode.) By inducing destructive interference and increased absorption through a suitable choice of optical path length and an adaptation of the electrochromic electrode surface, contrast ratios up to approximately 100:1 are achieved as compared to 2:1 for a similar device without these modifications.

DETAILED DESCRIPTION

Figure 1:
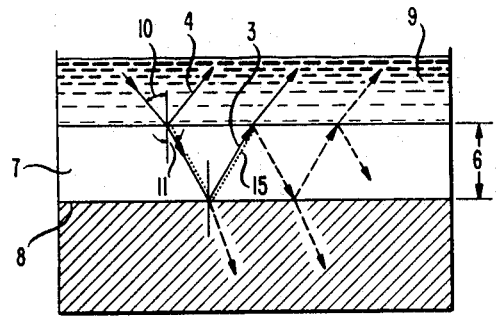
FIGS. 1 and 2 represent configurations of an electrochromic electrode suitable for practice of the subject invention.

The subject invention is generally applicable to electrochromic devices. As discussed earlier, the contrast ratio of an electrochromic device is the ratio of observable light reflected or transmitted by the device in its bleached state to that reflected or transmitted in the colored state. Thus, a significant increase of optical absorption and hence a decrease of reflectance or transmittance of an electrochromic electrode in its colored state, for a given level of observed light in the bleached state, produces an advantageous increase in the contrast ratio. It is possible to increase substantially the optical absorption of the colored state without substantially affecting the brightness of the bleached state by appropriately adjusting the optical path length of the light in the electrochromic electrode and by utilizing an oblique angle of incidence. This phenomenon occurs due to increased light absorption resulting from a combination of increased path length and destructive interference. (Light undergoing destructive interference is absorbed within the electrochromic electrode.) These combined effects produce a significant contrast enhancement when the amplitude of the electric field of the light exiting the electrochromic material is approximately the same as that of the light reflected directly at its outer surface and when the phases of these two fields are separated by approximately 180 degrees. for a three-phase stratified layer device of the type illustrated in FIG. 1, where 9 is the electrolyte, 7 is the electrochromic material, and 8 is the reflective backing surface, maximum destructive interference occurs when the electrochromic layer thickness, d, is approximately equal to the value given by equation (1). Generally, thicknesses in the range 150 to 400 nm are used for typical electrochromic materials such as iridium oxide and for incident light in the visible wavelength range. For many applications the light source used to illuminate the electrochromic electrode is polychromatic. To ascertain the wavelength, $\lambda$, within the incident light spectrum, used to determine the appropriate thickness, d, the ultimate application of the device is considered. The value of $\lambda$ selected is the wavelength within the incident light spectrum which it is desired to extinguish most effectively. For example, this wavelength is either that of highest intensity within the incident spectrum or alternatively that of highest detectability—the wavelength where the product of incident light intensity with the response function of the photodetector, e.g., the human eye, is greatest. Although the preferred enhancement of the contrast ratio occurs when the thickness of the electrochromic material is that given by equation (1), acceptable contrast ratios are achieved when the thickness is within $\pm(\Delta d/4)$ of this value, where $\Delta d$ is given by equation (2).

To produce the desired optical path length and to induce interference, the electrochromic material should also be in intimate contact with a reflective surface that delimits the optical path. (Intimate contact includes the possibility of an interposed layer between the electrochromic material and the reflective backing provided that the changes in optical conditions engendered by this interposed layer are compensated for as described below so that destructive interference still occurs.)

In a preferred embodiment, a three-phase stratified layer device is constructed by growing or depositing a layer of an electrochromic material of essentially uniform thickness directly on a reflecting metal backing. Incident light which enters and traverses the layer of electrochromic material is reflected from the reflective backing, again traverses the electrochromic layer and is retransmitted into the incident medium, i.e., the electrolyte. Upon reaching the electrolyte/electrochromic interface it interferes with incident light reflected directly at this interface. (Multiple reflections of light within the electrochromic layer also occur. However, the fraction of light that undergoes multiple reflection is quite limited and does not substantially affect the contrast.) Contrast enhancement is caused by destructive interference between the reflected light rays (3 in FIG. 1) traversing the electrochromic material, e.g., anodic iridium oxide, and the light rays, 4, which are directly reflected at its outer surface. If light from a localized source traverses the electrochromic electrode, and is substantially scattered by this electrode during its traversal, the contrast enhancement between the bleached and colored states of the electrode produced by destructive interference is reduced since the reflectance of the electrode in its bleached state will appear to have been lowered relative to the reflectance of the electrode in its colored state. Thus, in cases where a localized light source is employed it is desirable to maintain a relatively low level of scattering. For most applications, it is desirable that less than approximately 50 percent and preferably less than 10 percent of the light incident on the electrochromic electrode be scattered. However, as discussed below, in cases where diffuse light, or light from more than one localized source is used for illumination, an electrode surface that produces scattering has certain advantages.

In a preferred embodiment, for a three-phase stratified electrode as shown in FIG. 1, the electrochromic material in the electrode should have a refractive index, $n_2$, greater than that of the electrolyte medium, $n_1$, to avoid the possibility of total or attenuated internal reflection of obliquely incident light. For example, if the electrochromic electrode is immersed in a liquid electrolyte to form a device, the refractive index of the electrochromic material preferably should be greater than that of the liquid. It is possible for the electrochromic material to have a smaller refractive index and still avoid internal reflection provided light incident at angles greater than the critical angle, $$\phi_c = \arcsin(n_2/n_1) \qquad (3)$$

is avoided.

The thickness of the electrochromic electrode and the angle at which incident light strikes its surface are two significant parameters that affect the optical absorption, interference and contrast, and which are controllable. Larger angles of incidence are generally advantageous for producing increased contrast. As can be seen from FIG. 1, two factors contribute to enhanced optical absorption and contrast. First, the longer the optical path (shown by dotted line 15), the greater the absorption in the electrochromic material. A larger incident angle produces a longer path length and thus increased absorption. Secondly, an increased incident angle further increases absorption by affecting the degree of destructive interference. The observable light outgoing from the colored electrode is minimized when the electric vector of the directly reflected light ray, 4, is approximately equal in amplitude to that of the light ray, 3, which traverses the electrode. For practical electrochromic layer thicknesses, this condition is generally approached at larger angles of incidence. For example, for electrochromic iridium oxide the contrast ratio increases when the angle of incidence increases up to an angle of approximately 75 degrees and then begins to decrease again. This decrease at higher angles occurs because the amplitude of the directly reflected light, 4, begins to exceed that of the traversing light, 3, so that the degree of destructive interference is reduced. Thus, the best contrast ratios are achieved by increasing the angle of incident relative to the surface normal and adjusting the thickness of the electrochromic electrode so that the electric vectors of rays 3 and 4 are more closely matched in amplitude and opposite in phase at the electrolyte/electrochromic interface.

It should be noted, however, that the angle of incidence (10 in FIG. 1) increases, then so does the angle of refraction 11. This result is a direct consequence of Snell's law, $$n_1 \sin \phi_1 = n_2 \sin \phi_2 \qquad (4)$$

where the angle of incidence, $\phi_1$, the refractive index of the adjoining medium, $n_1$, and the refractive index of the electrochromic material, $n_2$, determine the angle of refraction, $\phi_2$. Since light undergoes a phase change $$\beta = 2\pi d n_2 \cos\phi_2/\lambda \qquad (5)$$

during each traversal of one-half the distance shown by the dotted line, 15, and since $\cos\phi_2$ becomes smaller as $\phi_2$ becomes larger, an increase in d is required to maintain the desired phase opposition and thus to maintain the desired degree of destructive interference. This result typically presents no problem. However, the response time of the device also varies with the thickness of the electrochromic material—the thicker the material the greater the response time. Adequate response times are generally attainable by using thicknesses less than about 400 nm for materials such as electrochromic iridium oxide. Although use of thicker layers to enhance contrast is not precluded, it should be recognized that such use will typically degrade response times. In this regard as noted from equation (1), destructive interference for $m \geq 1$ is achieved by using a thicker electrochromic layer. This is acceptable provided the caveat concerning response times is realized. Additionally, incident light polarized parallel to the plane of incidence requires a thicker layer than its perpendicularly polarized counterpart to achieve maximum destructive interference. Thus, use of perpendicularly polarized light is preferred. (Further, the electrochromic electrode in its bleached state is generally brighter for perpendicularly polarized light.) For incident light containing both polarization components, d is advantageously chosen to correspond to that for perpendicularly polarized light.

Figure 2:
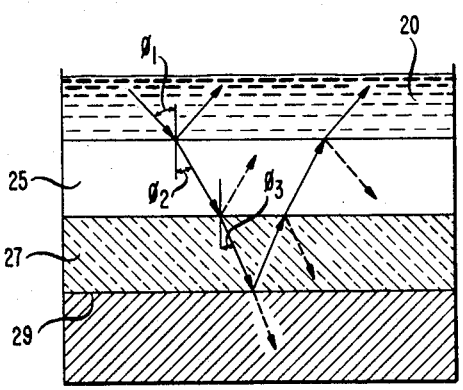

Although the three-phase stratified embodiment is preferred, other configurations are useful provided that they are constructed to promote destructive interference. For example, a four-phase stratified layer system as shown in FIG. 2 is employed. This sytem includes an electrolyte, 20, an electrochromic layer, 25, of thickness $d_2$, an essentially transparent layer, 27, of thickness $d_3$, and a reflective backing surface, 29, with suitable electrical contact to the electrochromic layer. In this situation, the appropriate condition for obtaining the desired destructive interference is obtained when the values of $d_2$ and $d_3$ are chosen to yield a value within $\pm(\Delta D/4)$ of D where $$D = 2(d_2 n_2 \cos\phi_2 + d_3 n_3 \cos\phi_3) \qquad (6)$$
$$= \frac{[(2m+1)\pi + \delta^r_{\nu 12} - \delta^r_{\nu 34}]\lambda}{2\pi}$$

and $$\Delta D = \lambda/2 \qquad (7)$$

and where $n_3$ is the refractive index of the transparent layer, $\phi_3$ is the angle of refraction in this layer, $\delta^r_{\nu 34}$ is the optical phase change occurring upon reflection at the transparent layer/reflector interface and all other symbols are as previously defined. (Values for $\delta_\nu$'s used throughout this description are calculated as described by W. N. Hansen, *Journal of the Optical Society of America*, 58, 380, (1968) from measured values of optical constants. It should also be noted that this treatment ignores any reflection at the electrochromic layer/transparent layer interface. However, this assumption is quite good since such reflection is typically negligible.) Again, it is desirable, as with the three-phase stratified layer device, to insure that internal reflection does not occur. This is preferably done by insuring that $n_1 \leq n_2 \leq n_3$.

Figure 3:
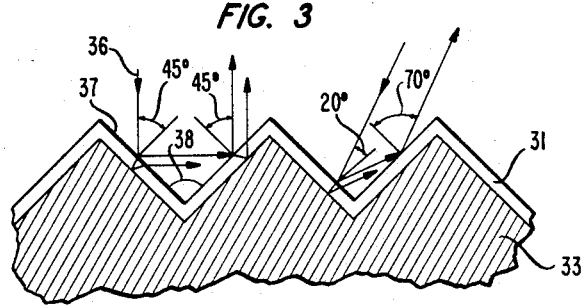
FIGS. 3 and 4 show surface adaptations of the electrochromic electrode that are useful in the subject invention.

Once an electrochromic electrode is chosen, there are various methods of adapting its surface so that the incident light strikes the surface of the electrochromic material at an angle other than at normal incidence and preferably at an angle relative to its surface normal in the range 20 degrees to 80 degrees, most preferably 45 degrees to 75 degrees. In one embodiment, a layer of a material such as electrochromic iridium oxide is grown on the surface of a reflective metal backing by deposition of an iridium metal film followed by partial or complete conversion of the iridium metal to its hydrous oxide. (This conversion to hydrous iridium oxide is done, for example, by cyclic electrochemical anodization as described in U.S. Pat. No. 4,191,453, issued Mar. 4, 1980, which is hereby incorporated by reference. If the anodization is complete, a previously deposited inert reflective layer, e.g., a gold layer, below the iridium acts as the necessary reflector. If the anodization is partial and leaves a layer of iridium thicker than about 100 nm, this iridium layer is useful as the reflector.) The electrochromic layer after fabrication has the same configuration as the reflective backing. For example, as shown in FIG. 3, the electrochromic layer, 31, conforms to backing, 33. Thus, adapting the surface of the backing produces the desired adaptation of the surface of the electrochromic layer. For example, the reflective backing is advantageously made with a grooved surface which is previously produced by conventional techniques. For example, grooved surfaces are produced by techniques such as mechanical ruling of a metal or chemical etching in materials such as silicon. These grooved surfaces are replicated by methods such as epoxy molding (described below). The reflective surface is then made by metallizing the grooved replication with one or more layers of metals. The number of grooves per mm generally should be in the range 10 to 100. More grooves per mm typically cause undesirable diffraction of incident light and fewer grooves/mm generally degrade the visual appearance. Improved performance is obtained when the grooves are spaced as closely as possible. Small spacings cause a greater percentage of the incident light to strike the surface at oblique incidence. Preferably, the spacings should be smaller than 10 percent of the groove width. As shown in FIG. 3, since the electrochromic material when formed follows the contours of the grooves, light, 36, normally incident to the substrate of the electrode strikes the outer surface, 37, of the electrochromic material, at an oblique angle. (The thickness of the electrochromic layer is exaggerated for clarity.) Using V-shaped grooves produces two opportunities for destructive interference (see FIG. 3) and thus is advantageous. (The net contrast ratio in this case is the product of the individual contrast ratios for each incidence of light on a groove wall.) However, use of grooves producing more than two opportunities for destructive interference is not preferred since the reflectance of the electrochromic electrode in its bleached state is excessively degraded. The angle of the V-shaped groove, 38, is advantageously chosen to be in the range 50 degrees to 120 degrees, and preferably 60 degrees to 100 degrees. By using these criteria for the groove angle two purposes are achieved. First, the possibility of three or more reflections is avoided, and, second, the desirable occurrence of two reflections is provided. Although angles outside the desired range are useful, depending on the distribution of incident angles of illuminating light, the specified angles are generally useful irrespective of this distribution. In this manner, the incident angle at each wall is made oblique and thus enhances the contrast. A groove angle of 90 degrees has the advantage of causing the doubly reflected light to exit the grooves in the direction parallel to its incident direction. (Although the electrode surface is adapted, a small fraction of incident light may strike the surface at a normal. The surface is still appropriately adapted despite this negligible fraction.)

Figure 4:
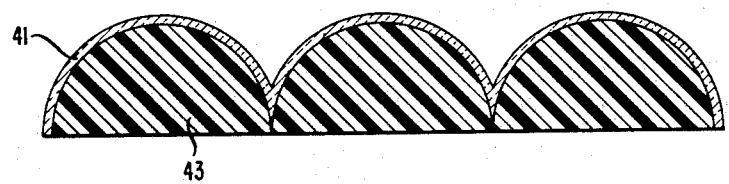

Alternatively, it is possible to use a microcell patterned reflective surface to produce the desired angle of incidence. For example, the surface configuration of a focusing screen such as manufactured by Minolta Corporation, which has the cross-sectional structure shown in FIG. 4 is useful. (The screen is denoted 43 and the electrochromic layer 41. The thickness of the electrochromic layer is exaggerated for clarity.) This microcell pattern which contains approximately $2.5 \times 10^5$ hemispherical cells per cm$^2$ is transferred to the surface of the electrochromic material by conventional replication techniques. For example, a mold of the focusing screen surface is made by pouring a material such as silicone rubber, e.g., General Electric flexible silicone molding compound over the patterned surface. After this material cures, it is removed and is used as a mold to produce a positive of this microcellular surface configuration. This positive is manufactured by using a material such as a polyamine-cured epoxy resin. The epoxy resin such as that formed by mixing Bakelite Resin ERL-3794 with Bakelite Hardener ERL-2807 (5:1), (a proprietary product of Union Carbide Corporation, Plastics Division,) is poured over the mold and after curing is removed. An evaporated reflective metal backing and a layer of electrochromic material are then formed on the patterned surface of the epoxy replica as described above for grooved surfaces.

Some expedients, such as the previously described microcell pattern used for producing an oblique incident angle, to an extent also produce diffuse scattering of light. This microcell configuration induces light to strike the surface of the electrochromic material over a range of incident angles rather than at one specific angle. This phenomenon somewhat decreases the degree of destructive interference that is obtainable since the electrochromic layer thickness, d, specified in equation (1) is chosen to result in a 180 degree phase change between the directly reflected light and the refracted/reflected light for a given angle of incidence. Nevertheless, significant improvement of contrast is still possible if the electrochromic electrode thickness is appropriately tailored. The thickness utilized should preferably be that obtained by using equation (1) and the average angle of incidence of light striking the electrochromic surface. However, if it is impractical to measure the average incident angle, improved contrast is still achieved by utilizing a thickness, d, corresponding to the optimum contrast obtainable. (This optimum thickness value d is ascertained empirically by utilizing a controlled sample. A single incident angle of light is produced on the surface of a thin layer of electrochromic material in the chosen device and the contrast ratio is measured. The thickness of the electrochromic material is then increased, for example, by in situ anodic cyclic growth and the contrast ratio remeasured. This procedure is followed for a variety of angles, e.g., every 10 degrees, and a graph is made by interpolation. From these angular dependent measurements, the thickness giving the best contrast ratio is then employed.)

Once an appropriate electrochromic electrode with its surface adapted for producing incident light at other than normal incidence is produced, the remainder of the electrochromic device is fabricated. For example, in a preferred embodiment a means for applying voltage to the device, i.e., electrical contacts, are made to the reflective metallic surface of the electrochromic material by conventional techniques such as by forming a pressure contact. The electrochromic layer of the electrode is then contacted, by means such as immersion, with an electrolyte, e.g., aqueous 0.5 M $Na_2SO_4$ adjusted to pH 3.5 by addition of sulfuric acid. A counterelectrode is made from a material such as hydrous iridium oxide and also contacted with the electrolyte. Preferably, the counterelectrode should contain a larger number of electrochemically oxidizable or reducible equivalents than the electrochromic electrode. Electrical contact to the counterelectrode is made by a conventional technique such as forming a pressure contact.

I claim:

1. An electrochromic device comprising (1) an electrolyte in intimate contact with both an electrochromic layer of (2) an electrochromic electrode, and with a (3) counterelectrode, characterized in that said electrochromic layer includes means for receiving incident light at an angle other than 90 degrees to the surface of said layer, said electrochromic electrode includes a reflective backing surface, and the dimensions of said electrochromic electrode that determine the optical path length from said surface of said electrochromic layer to said reflective surface and back produces destructive interference.

2. The device of claim 1 wherein said electrochromic material comprises iridium oxide.

3. The device of either claim 1 or 2 wherein the thickness of said electrochromic layer is within $\Delta d/4$ of a thickness given by $$d = \frac{(2m + 1)\pi + \delta^r_{v12} - \delta^r_{v23}}{4\pi n_2 \cos\phi_2} \lambda$$

where $\phi_2$ is the angle of refraction of said incident light in said electrochromic layer, $n_2$ is the real part of the refractive index of said electrochromic layer for said incident light of vacuum wavelength $\lambda$, m is an integer (0, 1, 2, ...), $\delta^r_{v12}$ and $\delta^r_{v23}$ are the optical phase changes occurring upon reflection at the electrolyte/electrochromic and the electrochromic/reflector interfaces, respectively $\Delta d = \lambda/4n_2 \cos \phi_2$.

4. The device of either claim 1 or 2 wherein said means for receiving incident light at an angle other than 90 degrees to the surface of said electrochromic layer includes grooves in said surface.

5. The device of claim 4 wherein said grooves form a 90 degree angle.

6. The device of claim 1 wherein said reflective backing surface comprises iridium.

7. The device of claim 1 wherein said means for receiving incident light at an angle other than 90 degrees to the surface of said electrochromic layer includes a microcellular pattern in said surface.

* * * * *

UNITED STATES PATENT AND TRADEMARK OFFICE
CERTIFICATE OF CORRECTION

PATENT NO. : 4,348,078
DATED : September 7, 1982
INVENTOR(S) : James D. E. McIntyre It is certified that error appears in the above—identified patent and that said Letters Patent is hereby corrected as shown below:

In the Specification, column 2, line 23, "$\delta_{v12}r$" should read --$\delta^r_{v12}$--; "$\delta_{v23}r$" should read --$\delta^r_{v23}$--. Column 3, line 4, "for" should read --For--. Column 5, line 57, "$\delta_{v34}r$" should read --$\delta^r_{v34}$--; line 60, "$\delta_v^4$'s" should read --$\delta^r_v$'s--.

In the Claims, column 8, line 52, "$\delta_{v12}r$" should read --$\delta^r_{v12}$--; "$\delta_{v23}r$" should read --$\delta^r_{v23}$--.

Signed and Sealed this

Twenty-eighth Day of December 1982

[SEAL]

Attest:

GERALD J. MOSSINGHOFF

Attesting Officer

Commissioner of Patents and Trademarks